(12) United States Patent
Santarelli

(10) Patent No.: US 11,654,528 B2
(45) Date of Patent: May 23, 2023

(54) WASH DEVICE, ASSEMBLY, AND SYSTEM THEREOF

(71) Applicant: Nordica Plastics, Ltd., Mississauga (CA)

(72) Inventor: Carmine Santarelli, Mississauga (CA)

(73) Assignee: Nordica Plastics, Ltd, Mississauga (CA)

( * ) Notice: Subject to any disclaimer, the term of this patent is extended or adjusted under 35 U.S.C. 154(b) by 392 days.

(21) Appl. No.: 16/933,070

(22) Filed: Jul. 20, 2020

(65) Prior Publication Data

US 2021/0023676 A1 Jan. 28, 2021

Related U.S. Application Data

(60) Provisional application No. 62/878,449, filed on Jul. 25, 2019.

(51) Int. Cl.
| | | |
|---|---|---|
| *B08B 3/14* | (2006.01) | |
| *B24B 53/017* | (2012.01) | |
| *B01D 35/027* | (2006.01) | |
| *B01D 29/05* | (2006.01) | |

(52) U.S. Cl.
CPC ............ *B24B 53/017* (2013.01); *B01D 29/05* (2013.01); *B01D 35/027* (2013.01); *B08B 3/14* (2013.01)

(58) Field of Classification Search
CPC ........ B08B 3/14; B01D 29/05; B01D 35/027; B24B 53/017
USPC .......................................................... 134/110
See application file for complete search history.

(56) References Cited

U.S. PATENT DOCUMENTS

| | | |
|---|---|---|
| 6,761,271 B1 | 7/2004 | Cresswell |
| 7,025,880 B2 | 4/2006 | Lamb |
| 8,042,215 B2 | 10/2011 | Thibault |
| 8,893,734 B2 | 11/2014 | McLain |
| 9,192,279 B1 | 11/2015 | Valle et al. |
| 2012/0298148 A1* | 11/2012 | McLain ................. B24D 13/00 134/116 |

FOREIGN PATENT DOCUMENTS

WO 2019200456 A1 10/2019

OTHER PUBLICATIONS

International Search Report and Written Opinion for PCT Application PCT/CA2019/050398, dated Jun. 14, 2019.

* cited by examiner

*Primary Examiner* — Tinsae B Ayalew
(74) *Attorney, Agent, or Firm* — Westman, Champlin & Koehler, P.A.

(57) ABSTRACT

A device for washing an article in a container of fluid includes a cover having a wash surface, an opposed undersurface, and multiple ducts extending therethrough, where each of the ducts has an internal wall that tapers outwardly as the duct extends away from the wash surface, and a base operatively coupled to the cover, the base having a support surface and an opposed interior surface positioned facing the undersurface of the cover. The device further includes a resilient member operatively coupled between the cover and the base to bias the cover and base apart. Pushing the article against the wash surface presses the cover towards the base and directs a portion of the fluid through the ducts onto the article. Also disclosed are a wash assembly and a washing system including the device.

17 Claims, 16 Drawing Sheets

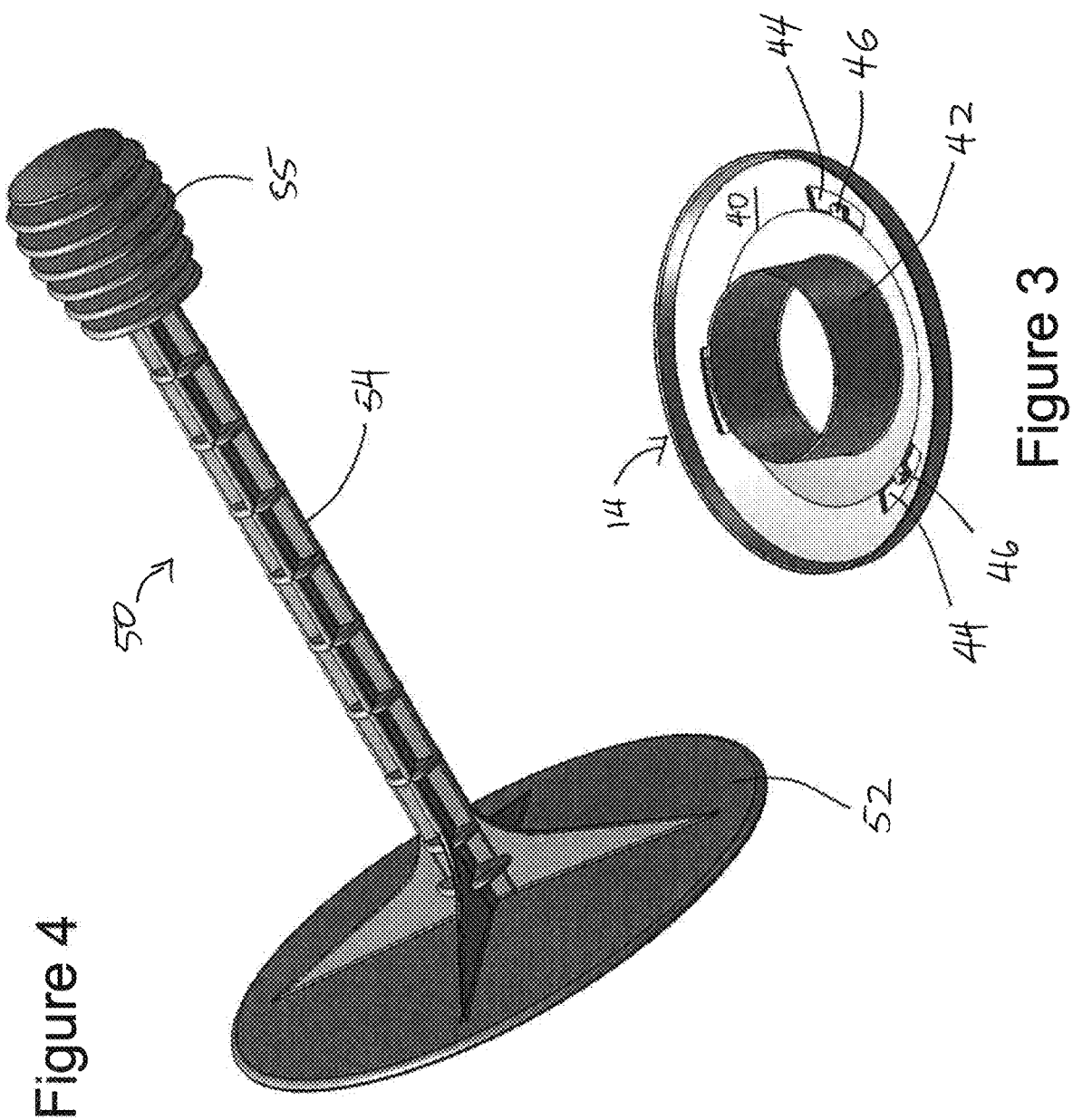

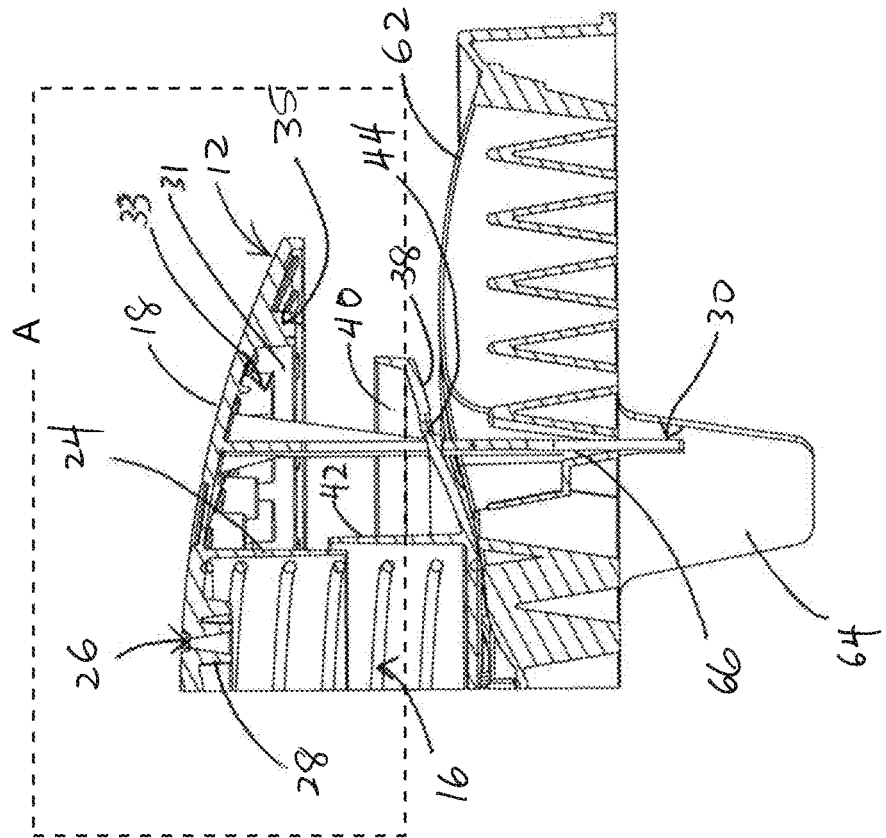

WASH DEVICE, ASSEMBLY, AND SYSTEM THEREOF

CROSS-REFERENCE TO RELATED APPLICATION

The present application claims priority to U.S. Provisional Patent Application Ser. No. 62/878,449, filed Jul. 25, 2019, which is hereby incorporated by reference in its entirety.

FIELD

This invention relates generally to an assembly for washing an article in a container of fluid, and in an embodiment, to a device for washing a polishing pad in a container of fluid.

BACKGROUND

Conventionally, when washing or polishing a vehicle or other object, the wash mitt, sponge, polishing pad, washcloth or other cleaning article that is used typically and eventually collects and retains particles, including oils, abrasive residue, mineral deposits and paint particles etc.

Washing the cleaning article often involves a lengthy process of preparing, soaking, cleaning, rinsing and drying the article. If the article to be washed is a polishing pad, the pad may be washed while attached to the polishing machine or drill and spun at high speeds in a bucket of cleaning fluid. However, spinning the article to scrub the pad often deteriorates the pad and exposes the machine to water damage. The article may instead be washed by hand. However, this is known to be labour intensive.

At times, the article may require special cleaning products or chemicals to be massaged into the article in order to help dissolve the embedded residue. Such cleaning processes can be highly labour intensive. As well, the frequent contact with the cleaning chemicals may be harsh on the hands and/or the article. This also often results in the user having to take protective measures, such as wearing gloves, when cleaning the articles.

SUMMARY

In one aspect there is provided a device for washing an article in a container of fluid, the device comprising a cover having a wash surface, an opposed undersurface, and multiple ducts extending therethrough, each of the multiple ducts having an internal wall that tapers outwardly as the ducts extend away from the wash surface; a base operatively coupled to the cover, the base having a support surface and an opposed interior surface positioned facing the undersurface of the cover; and a resilient member positioned between the cover and the base to bias the cover and base apart; wherein pushing the article against the wash surface presses the cover towards the base and directs a portion of the fluid through the ducts onto the article.

In another aspect there is provided a wash assembly for washing an article in a container of fluid, the assembly comprising: the device of described above; and a holder comprising: a head configured to be releasably securable to the article; and an elongate handle secured to the head.

In a further aspect there is provided a system for washing an article in a container of fluid, the system comprising: the wash assembly described above and a filter configured to be submerged in the fluid in the container for filtering debris particles from the fluid in the container and retaining the particles proximate a bottom of the container.

The present summary is provided only by way of example, and not limitation. Other aspects of the present invention will be appreciated in view of the entirety of the present disclosure, including the entire text, claims and accompanying figures.

BRIEF DESCRIPTION OF THE DRAWINGS

For a better understanding of the present invention, and to show more clearly how it may be carried into effect, reference will now be made, by way of example, to the accompanying drawings which show exemplary embodiments of the present invention in which:

FIG. 3 is an upper perspective view of the base of the wash device according to the first embodiment in isolation.

FIG. 4 is an upper perspective view of the article holder of a wash assembly in isolation.

FIG. 8 is a cross-sectional view of FIG. 5 along line 8-8.

FIG. 9 is a cross-sectional view of FIG. 5 along line 9-9.

Figure 1:
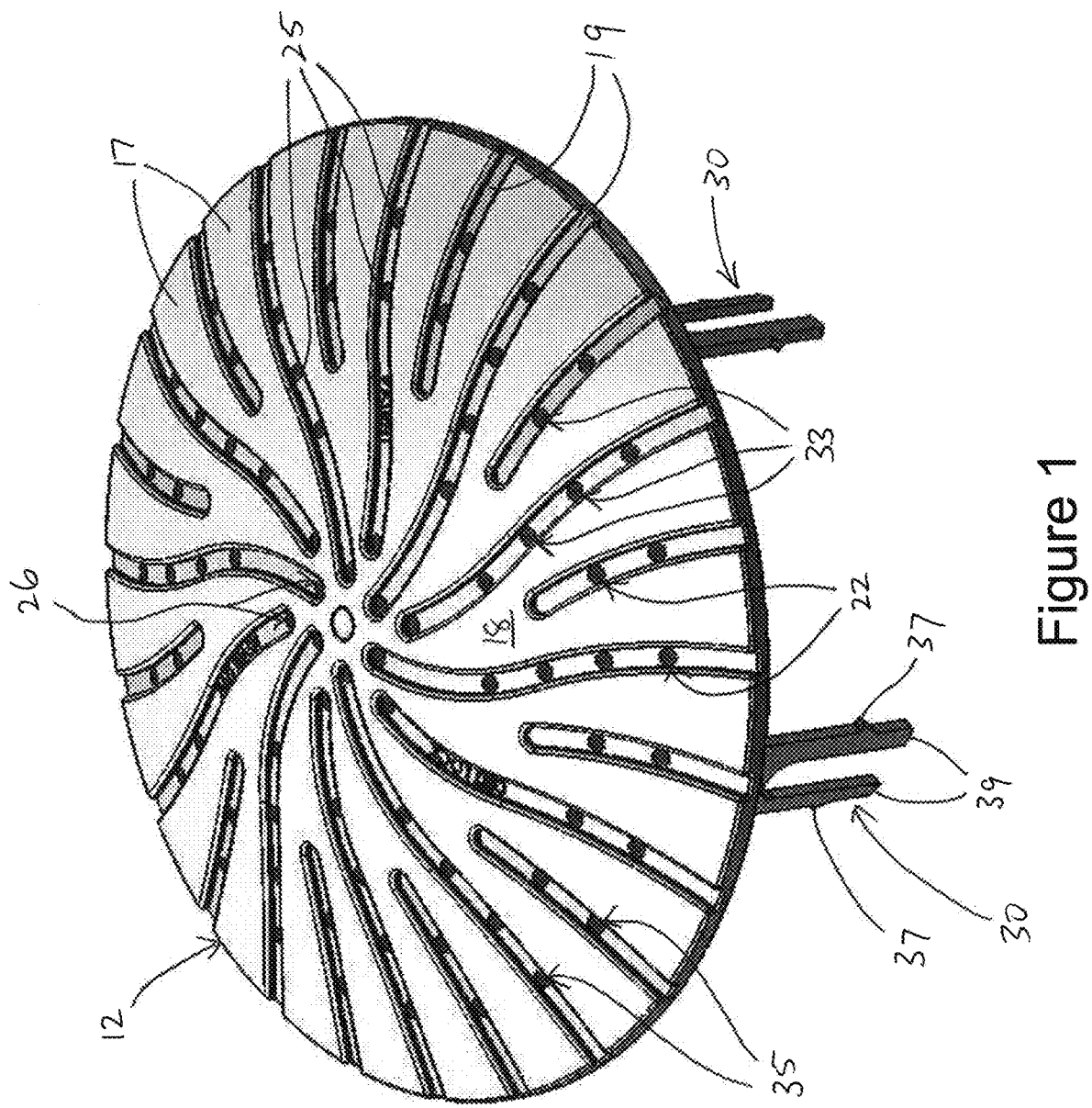
FIG. 1 is an upper perspective view of the cover of a wash device according to a first embodiment of the present invention.

While the above-identified figures set forth one or more embodiments of the present invention, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features, steps and/or components not specifically shown in the drawings.

DESCRIPTION

The present invention may be embodied in a number of different forms. The specification and drawings that follow describe and disclose some of the specific forms of the invention.

In FIGS. 1-10a, there is shown a device 10 for use with a holder 50 in a wash assembly 100 with a filter 60, forming part of a washing system 150, according to an example embodiment of the present invention. FIGS. 10-17 also illustrate device 10 with holder 50 in wash assembly 100 with filter 60 as part of washing system 150, according to the present invention.

Device 10 comprises a cover 12 and a base 14 operatively coupled thereto for washing an article 204 in a container 200 of fluid 206. Device 10 further includes a resilient member 16 operatively coupled between cover 12 and base 14 to bias cover 12 and base 14 apart.

Figure 2:
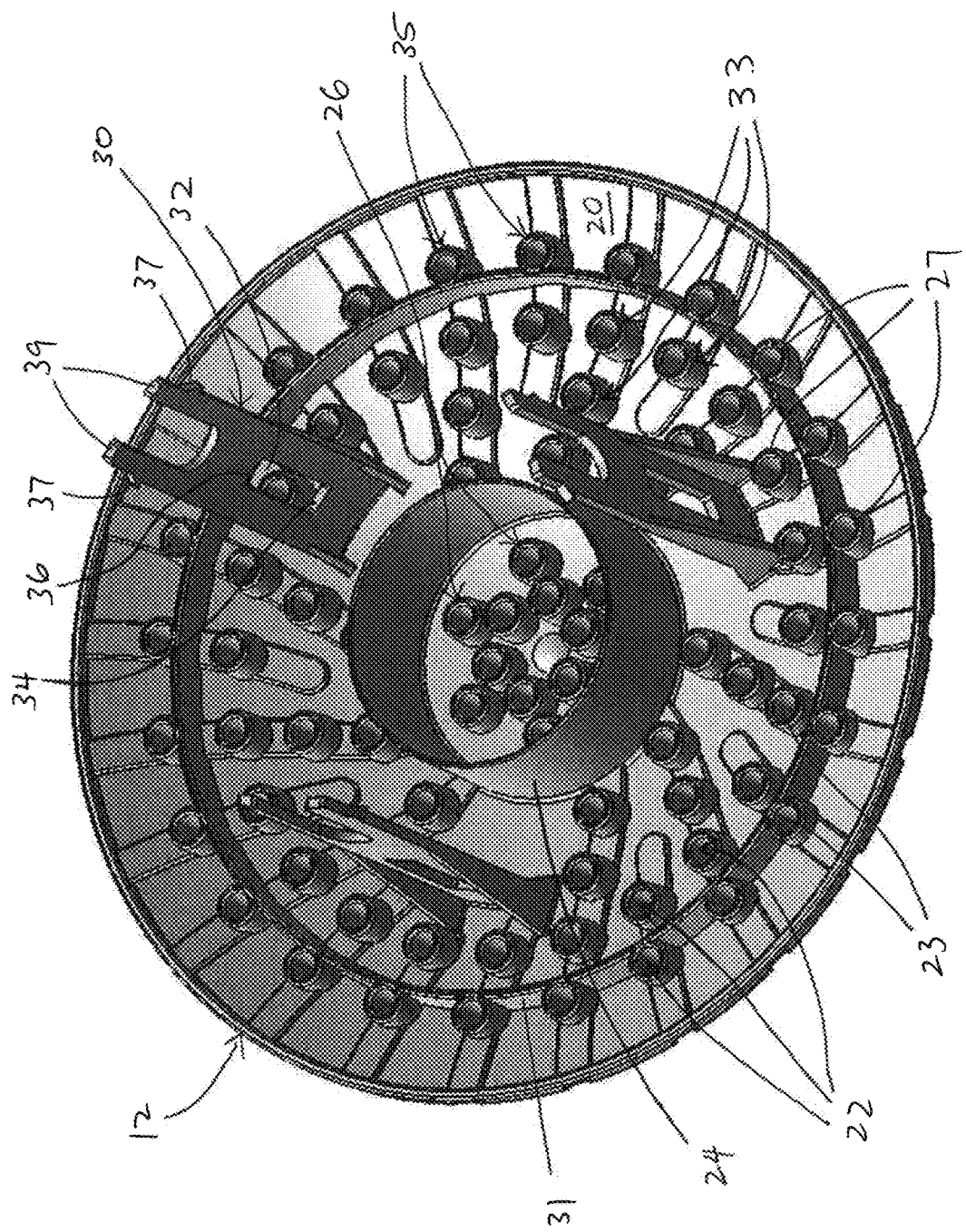
FIG. 2 is a bottom perspective view of the cover of FIG. 1.
Figure 5:
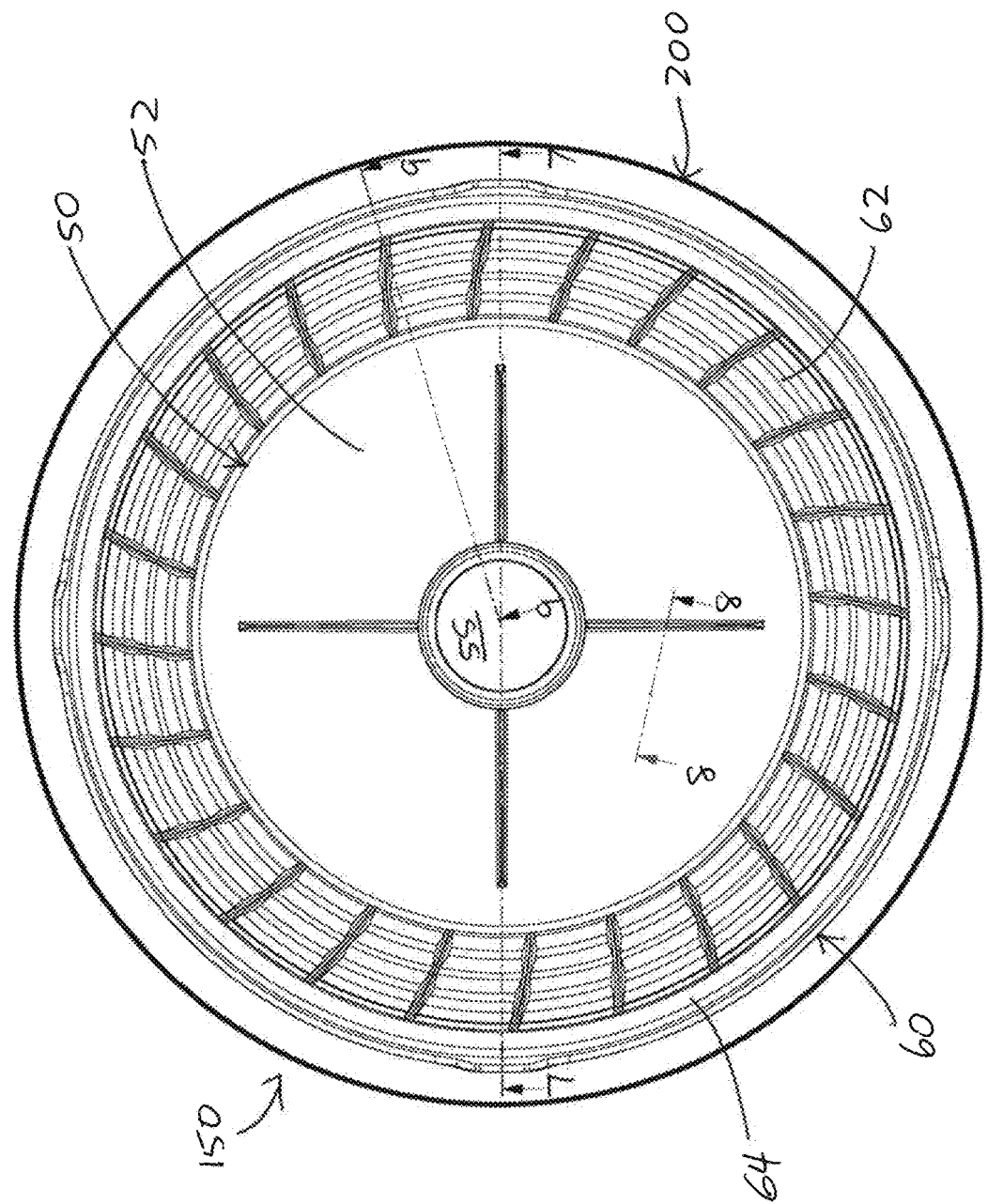
FIG. 5 is a plan view of a washing system with the holder of FIG. 4, the base of FIG. 3 and the cover of FIG. 1.
Figure 6:
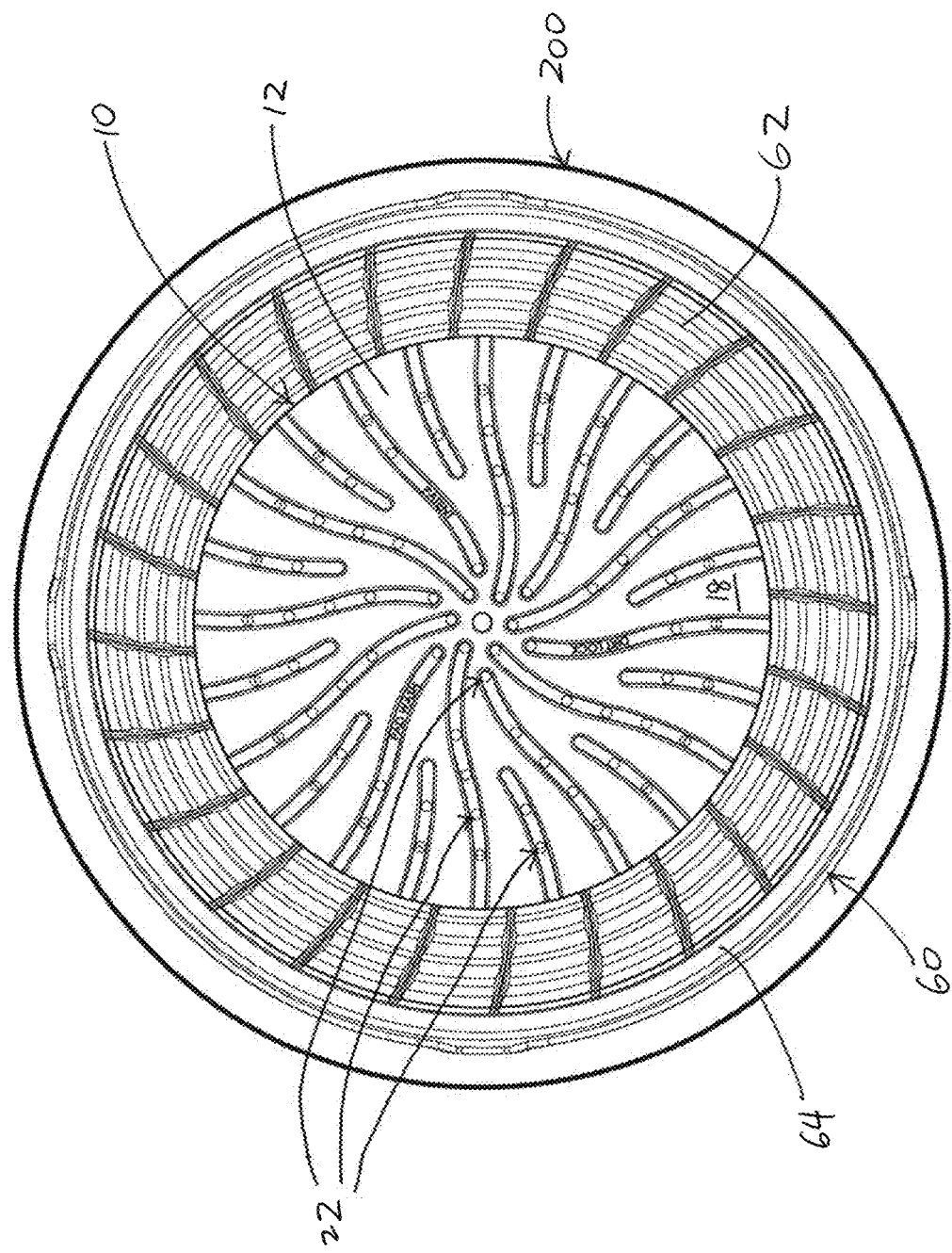
FIG. 6 is a plan view of FIG. 5 without the holder.
Figure 10:
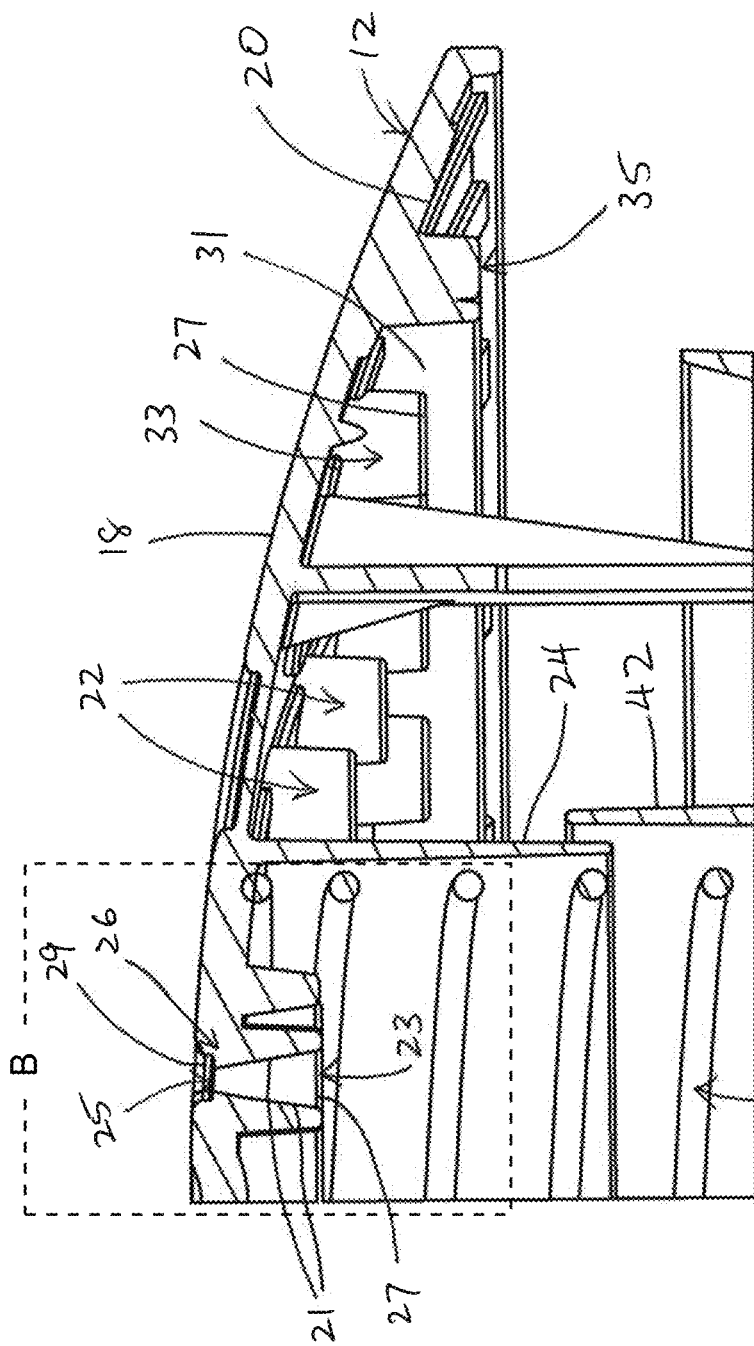
FIG. 10 is an enlarged view of portion A of FIG. 9.

As best seen in FIGS. 1, 2, and 10, cover 12 comprises a wash surface 18, an opposed undersurface 20, and multiple ducts 22 extending through cover 12. Each of ducts 22 has an internal wall 21 that is generally conical overall and that tapers outwardly in a direction extending away from wash surface 18. In this manner, each duct 22 creates a Venturi effect as fluid travels through each duct 22 toward and out the top of wash surface 18.

Figure 10A:
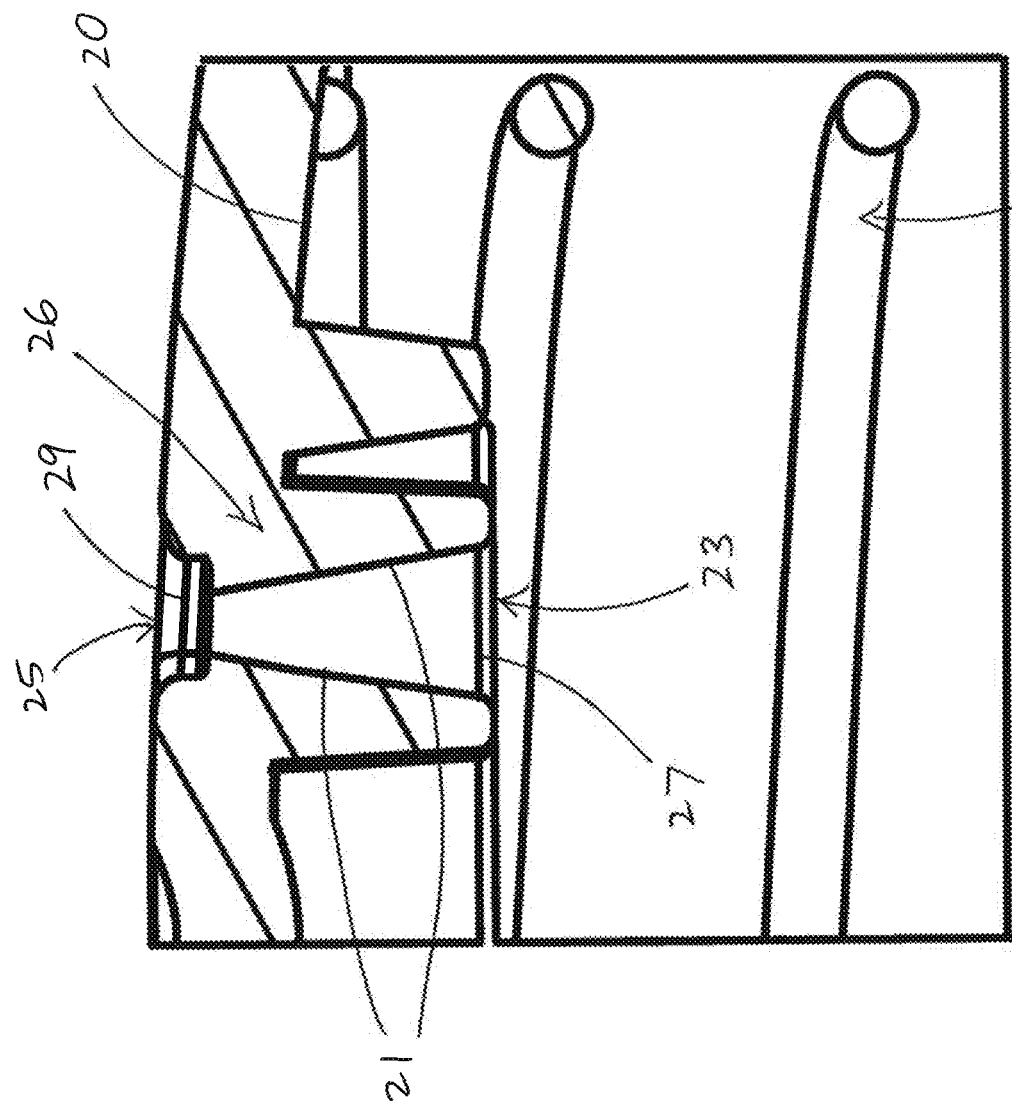
FIG. 10a is an enlarged view of portion B of FIG. 10.
Figure 11:
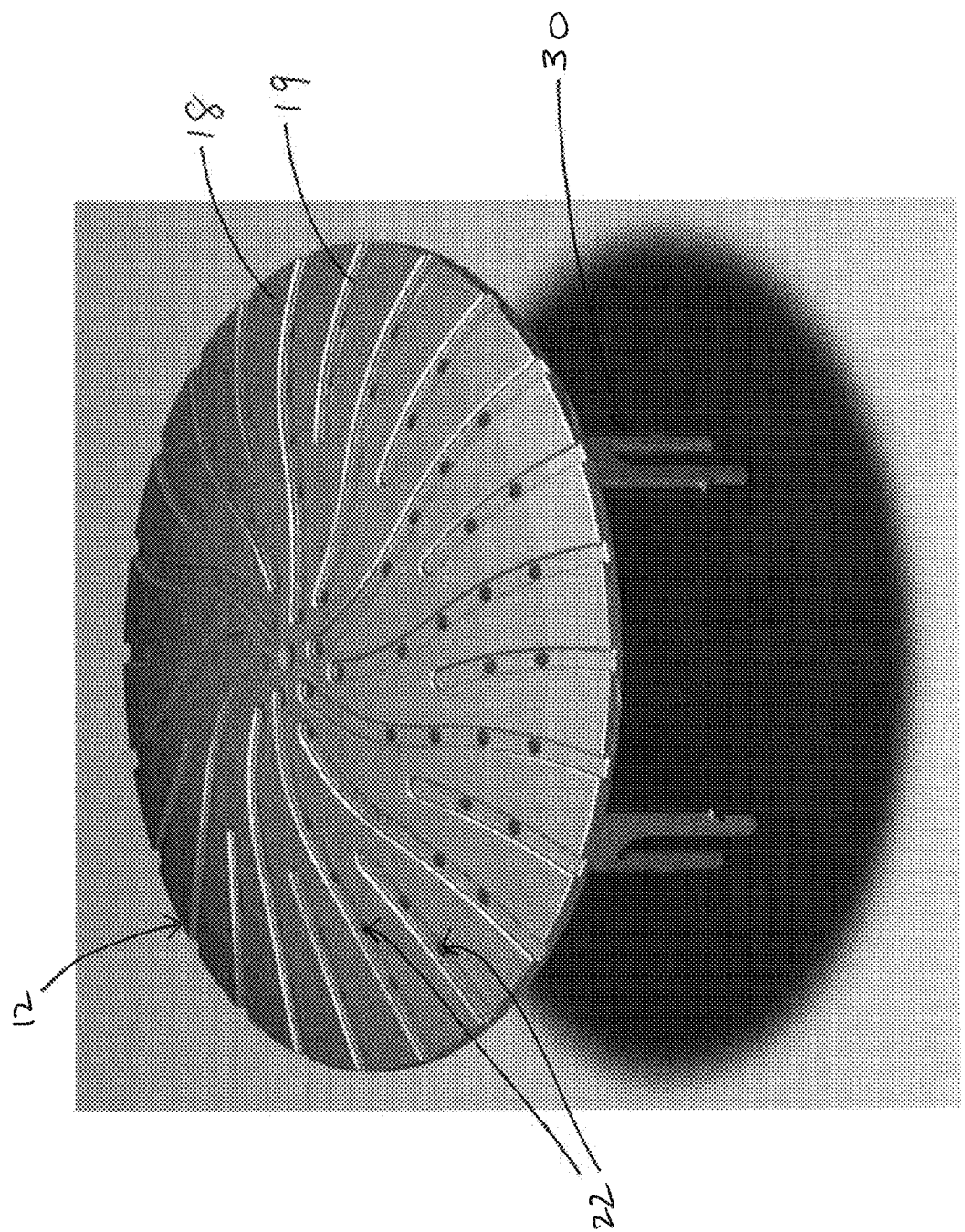
FIG. 11 is an upper perspective view of the cover of a device according the present invention.

A best seen in FIGS. 10 and 10a, each duct 22 has a downward facing entrance opening 23 and an upward facing exit opening 25. Due to the tapering of internal wall 21, entrance opening 23 is larger than exit opening 25. To help enhance the Venturi effect of fluid moving through duct 22, entrance opening 23 has a curved or rounded entrance edge 27, and exit opening 25 has a curved or rounded exit edge 29. The embodiment shown also illustrates ducts 22 extending past undersurface 20 of the cover 12.

In an alternate application, cover 12 may be thicker so that entrance openings 23 open onto undersurface 20 and do not extend past undersurface 20. As well, while internal walls 21 are shown to have a straight taper between entrance opening 23 and exit opening 25, in another alternate application, internal walls 21 may have a somewhat curved taper.

In the depicted embodiments, cover 12 has a convex disk or lens shape. Wash surface 18 may be corrugated with alternating ridges 17 and channels 19 which extend generally radially from a centre of cover 12. Channels 19, as shown, are elongate channels and exit openings 25 of ducts 22 are positioned along channels 19. As will be understood by the skilled person, wash surface 18 may be corrugated with a different set of shapes or irregularities in order to create a roughened wash surface 18 over which the article may be moved or scrubbed. Ducts 22 may also be positioned in a different configuration than the one shown.

Cover 12 may include a first conduit 24 extending downwardly from undersurface 20 and surrounding at least a first subset of ducts 22 in a manner similar as a surrounding wall or partition. As shown, the side wall of first conduit 24 may be solid and the first subset of ducts 22 surrounded by first conduit 24 are central ducts 26 centrally positioned in cover 12.

Cover 12 may also include a third conduit 31 that extends downwardly from undersurface 20 of cover 12. Third conduit 31 concentrically surrounds first conduit 24 and surrounds a second subset of ducts 22 in a manner similar to a surrounding wall or partition. As shown, the side wall of third conduit 31 may be solid and the second subset of ducts 22 surrounded by third conduit 31 are intermediary ducts 33 positioned around first conduit 24 and central duct 26.

In the embodiment depicted, third conduit 31 extends from undersurface 20 at least until it is generally parallel or coplanar with entrance openings 23 of ducts 22. In another application, third conduit 31 may extend past entrance openings 23 of ducts 22. In the embodiment shown, the wall of first conduit 24 extends further from undersurface 20 than that of third conduit 31.

Cover 12 may also have a third subset of ducts 22. The third subset of ducts 22 are periphery ducts 35 positioned around or outside third conduit 31, proximate the circumference of cover 12. In this manner, periphery ducts 35 are positioned around intermediary ducts 33 and central ducts 26.

The depicted embodiments illustrate cover 12 as having an extension or leg 30 extending from undersurface 20 of cover 12. Extension 30 has a hole 32, which has a top end 34 and a bottom end 36, a pair of lower legs 39 and a pair of sloped tabs 37 on the surface of lower legs 39. The particular embodiment of cover 12 in the Figures shows cover 12 having three extensions 30 extending from undersurface 20. As will be understood by the skilled person, cover 12 instead may have a different number of extensions 30, including a single extension 30, a pair of extensions 30, four extensions 30, or no extensions at all. If cover 12 has at least one extension 30, it may form part of a sliding mechanism which will discussed in greater detail further below.

Base 14 comprises a support surface 38 and an opposed interior surface 40. Base 14 is to be operatively coupled to cover 12, with interior surface 40 positioned facing undersurface 20 of cover 12.

In the depicted embodiments, similar to cover 12, base 14 also has a convex disk shape. Base 14 may have a smaller diameter than that of cover 12. In alternate embodiments, base 14 may have the same diameter as that of cover 12, or may have a larger diameter than that of cover 12.

Base 14 further has a second conduit 42 extending outwardly or upwardly from interior surface 40. Similar to first conduit 24, the wall of second conduit 42 may be solid. Second conduit 42 is preferably positioned and dimensioned to slidably telescope with first conduit 24. In the case of the embodiment shown, since first conduit 24 is positioned about the centre of cover 12, second conduit 42 is also positioned about the centre point of base 14 to be in telescoping relationship with first conduit 24. Other configurations are possible.

Base 14 further includes an opening 44 which is positioned and dimensioned to slidably receive extension 30 therethrough. In the depicted embodiments, since cover 12 has three extensions 30, base 14 has three openings 44 which are corresponding positioned to slidably receive one of extensions 30.

Each opening 44 also has a tab 46 extending therein. Tab 46 is dimensioned and shaped to fit and extend into hole 32 of its corresponding extension 30.

Resilient member 16 may be a spring 48 that is positioned within first and second conduits 24, 42. As will be understood by the skilled person, resilient member 16 may be a different element for biasing cover 12 and base 14 apart, including a resilient lever or foam material.

Figure 7:
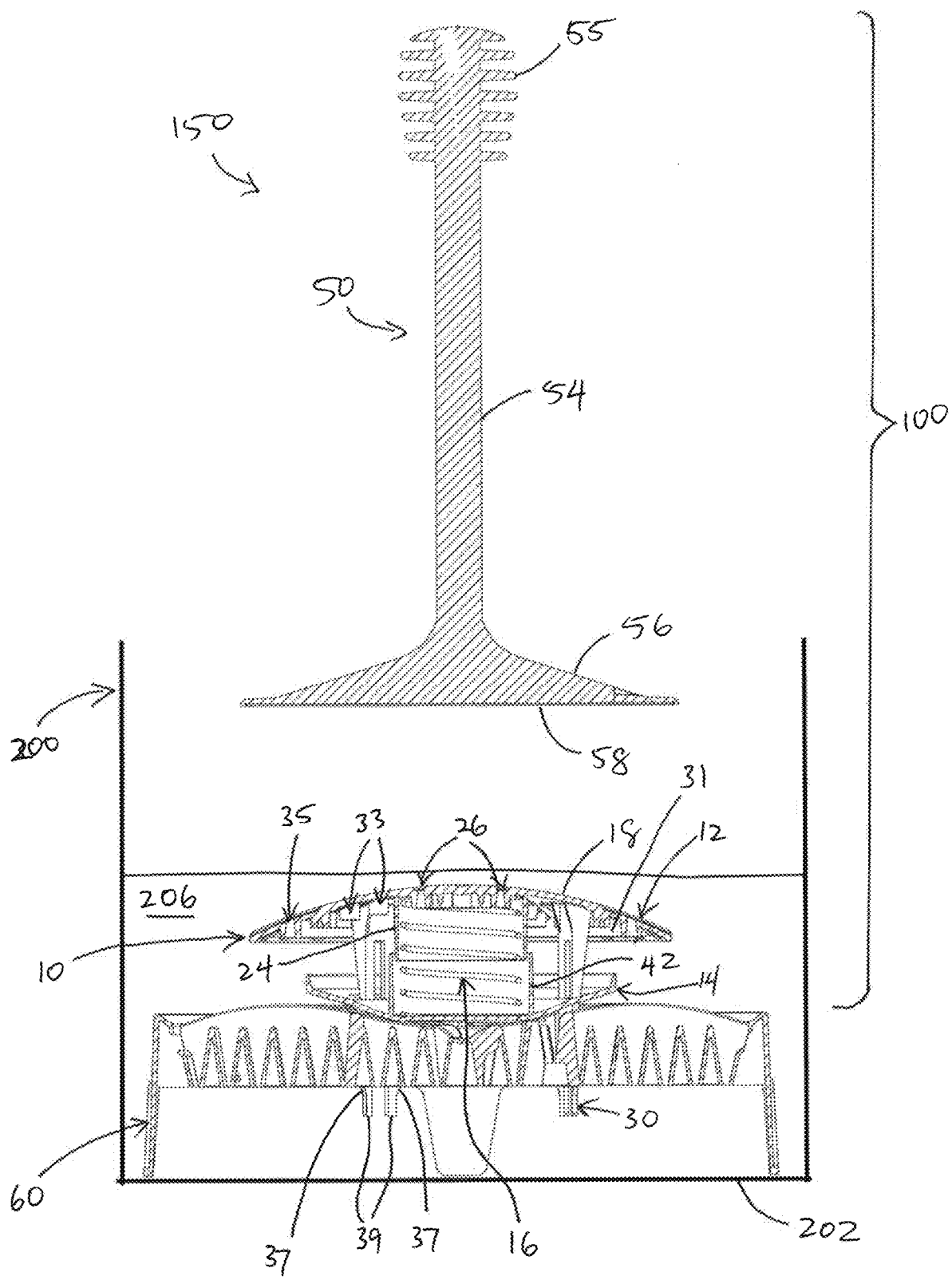
FIG. 7 is a cross-sectional view of FIG. 5 along line 7-7, the washing system being positioned within a container.

When cover 12 is coupled with base 14, interior surface 40 of base 14 is positioned facing undersurface 20 of cover 12, and first conduit 24 is positioned to slidably telescope with second conduit 42 (see FIGS. 7-9 for example). Extensions 30 extend from cover 12 a distance sufficient for them to be slidably received within corresponding openings 44 in base 14. As noted above, extensions 30 and openings 44 collectively form the sliding mechanism. Openings 44 act, in a fashion, as a guide for extensions 44 to slide through. In this manner, the sliding mechanism helps to support the operative coupling between cover 12 and base 14 by helping to ensure that cover 12 does not shift laterally relative to base 14. Lateral shifting could potentially bring first conduit 24 out of telescoping relationship with second conduit 42.

As well, when cover 12 and base 14 are coupled together, the sliding mechanism acts as a mechanism for limiting the relative movement between cover 12 and base 14. In the depicted embodiments, this mechanism comprises hole 32 in each extension 30, and the corresponding tab 46 in base 14.

As will be understood by the skilled person, the sliding mechanism may take on a different form other than extensions 30 and openings 44. For example, the sliding mechanism may include a tube extending from base 14, and a corresponding pin extending from cover 12, the tube positioned to slidably receive the pin therein when cover 12 is pressed towards base 14. The tube and/or pin may also act as the stopper mechanism. The tube and pin may extend to a specified height, such that when cover 12 is compressed into base 14, the height or distal end of the tube and/or pin may limit further compression of cover 12.

Wash assembly 100 includes device 10 and holder 50. An article may be washed in container 200 of fluid as described above using device 10 with holder 50. Holder 50 includes a head 52, configured to be releasably securable to the article, and an elongate handle 54 secured to head 52. Handle 54 may include a grip 55, while head 52 may include a Velcro® surface 58 for releasably securing the article thereto. As understood by the skilled person, rather than a Velcro® surface, head 52 may include a different fastener to releasably secure an article thereto. For example, where the article is a polishing pad, head 52 may also have slits within which a part of the article may be wedged to be frictionally held in place. Head 52 may be dimensioned to permit the pad to be held in place about the head by means of an elasticized pad.

Figure 12:
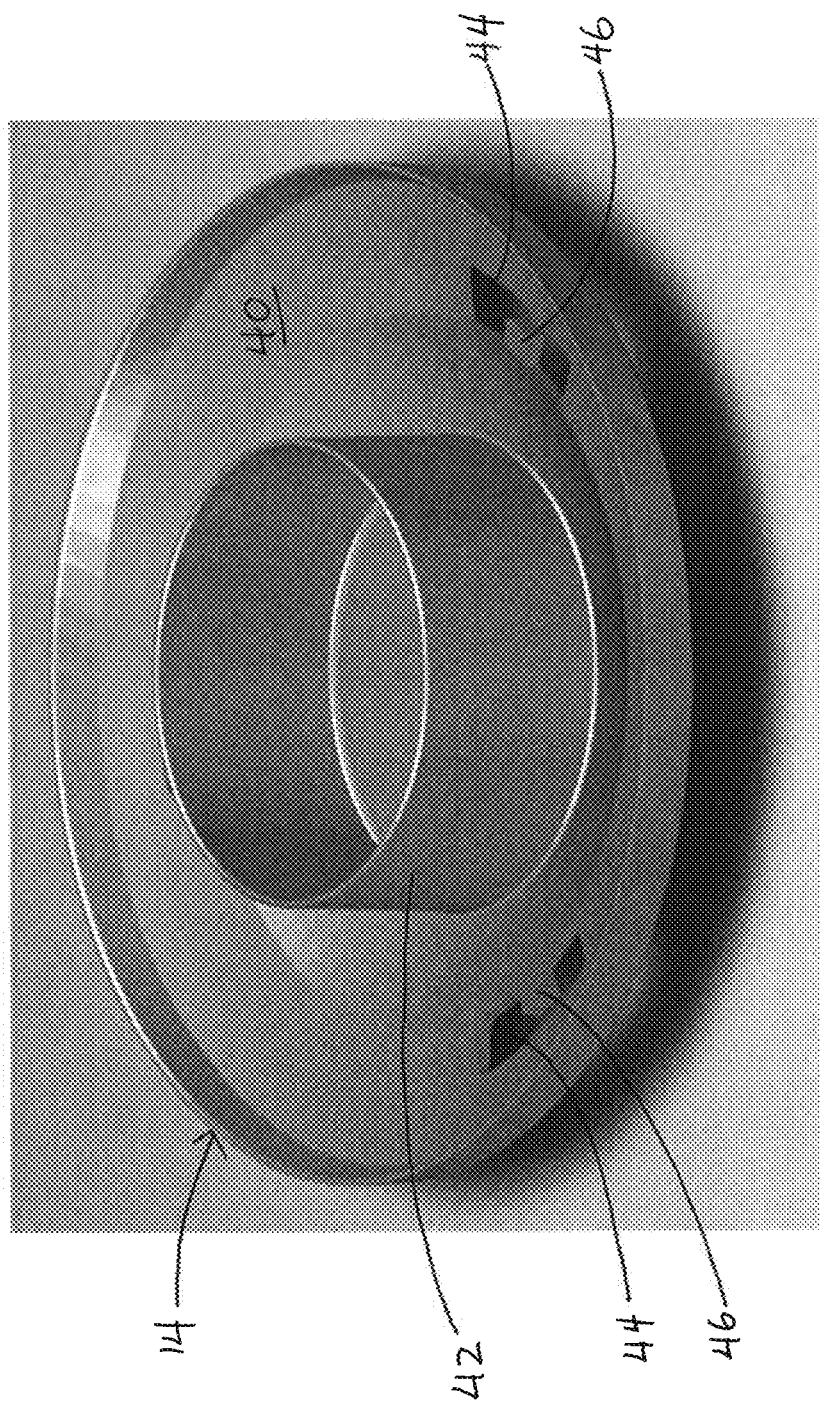
FIG. 12 is an upper perspective view of the base of the wash device.
Figure 13:
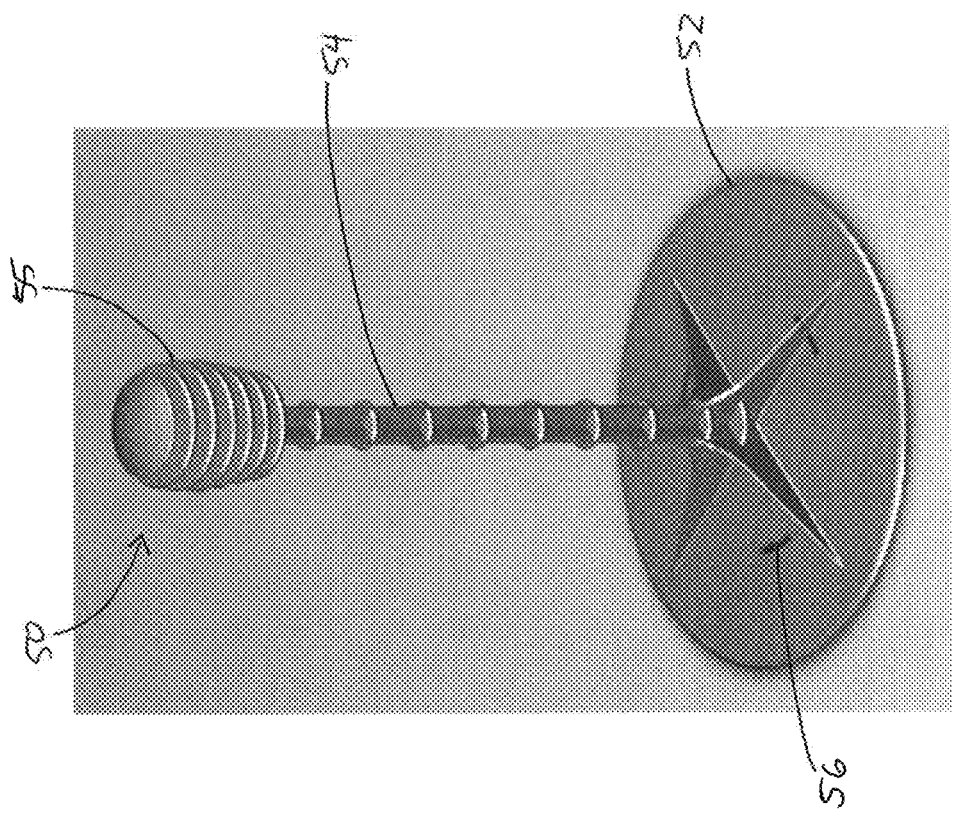
FIG. 13 is an upper perspective view of the holder of a wash assembly.

As best seen in FIGS. 4 and 12, head 52 may also include slots 56 dimensioned to releasably receive extensions 30 of device 10 therethrough for purposes of storing device 10. Wash assembly 100 may further include a bracket 68, see FIG. 13 for example. As shown, bracket 68 may be secured to a wall or other surface or structure. Bracket 68 is also configured to releasably hold or suspend handle 54 of holder 50. As depicted, bracket 68 has a notch 70 that is dimensioned to receive handle 54 of holder 50.

Washing system 150 includes device 10, holder 50, and filter 60. Article 204 may be washed in container 200 of fluid 206 as described above using device 10 with holder 50 and filter 60. Filter 60 is a filter configured to be submerged in fluid 206 in container 200 for filtering debris particles from fluid 206 in container 200. Filter 60 is also configured to retain the debris or particles proximate a bottom 202 of container 200.

To that end, filter 60 may comprise a flow director 62 and a support 64 for maintaining flow director 62 in spaced relation from bottom 202 of container 200. In the depicted embodiment, filter 60 is a Dirt Lock™ filter sold by Nordica Plastics Inc.

Filter 60 further may include gaps 66 positioned to correspond with openings 44 in base 14. Each gap 66 is dimensioned to slidably receive one of extensions 30 therethrough for seating base 14 on flow director 62. In such an application, as shown in FIGS. 7 and 9 for example, extensions 30 would extend from cover 12 past openings 44 and past flow director 62.

Figure 14:
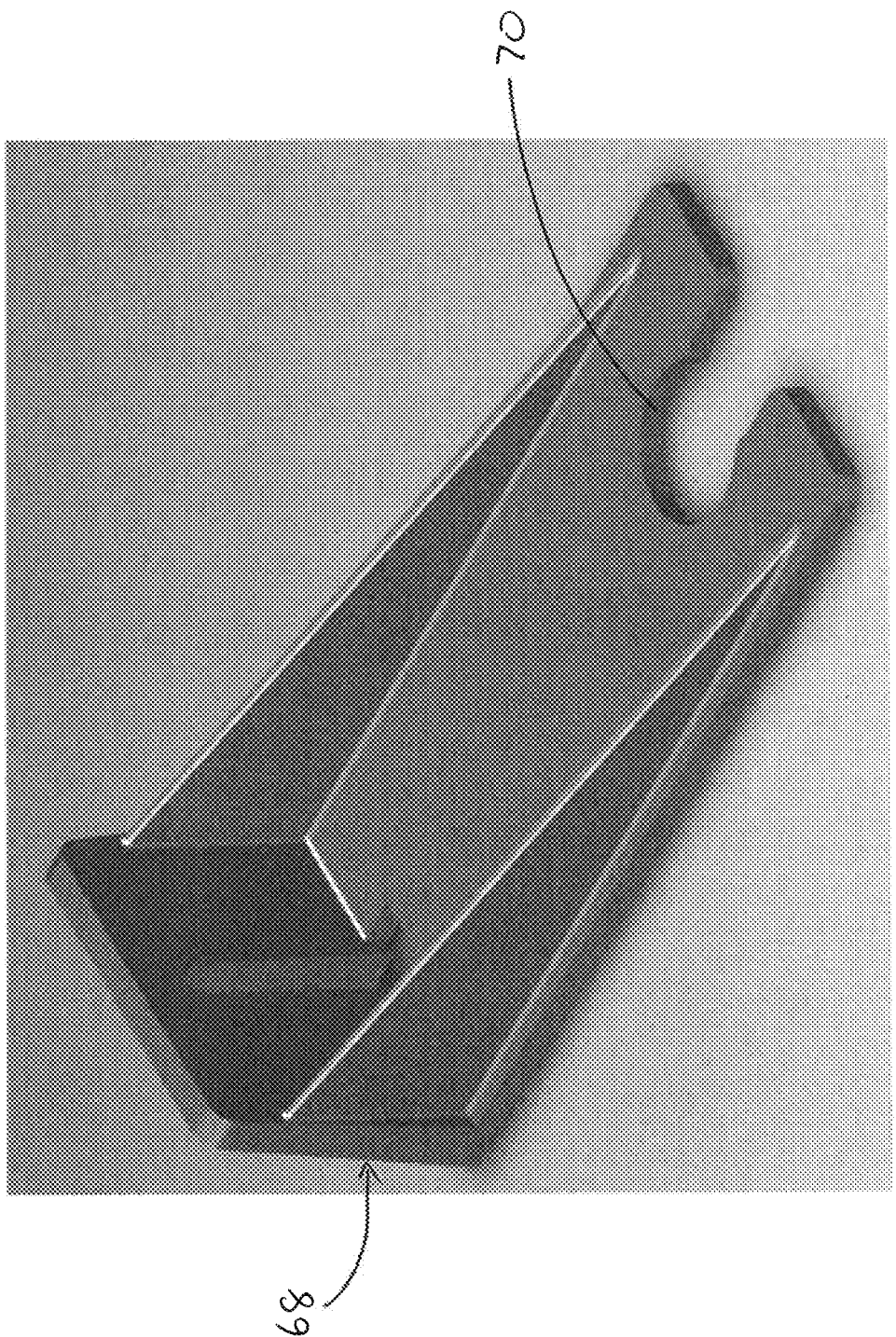
FIG. 14 is an upper perspective view of a bracket to suspend the article holder.

In use, when cover 12 and base 14 are coupled together, as shown in FIGS. 7 and 14 for example, extensions 30 extend through their corresponding openings 44, and tabs 46 are engaged with or seated within their corresponding holes 32. In its expanded or at rest position, spring 48 biases cover 12 and base 14 apart, such that extensions 30 slide through openings 44 until tabs 46 come into contact with bottom ends 36 of holes 32, thereby limiting or stopping the separation of cover 12 from base 14. See FIG. 8 for example.

Figure 15:
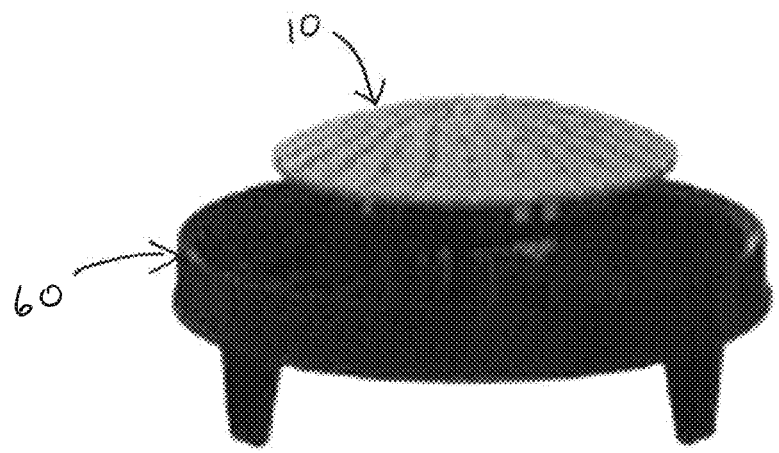
FIG. 15 is a side perspective view of the cover of FIG. 11 and the base of FIG. 12 assembled with a filter.
Figure 16:
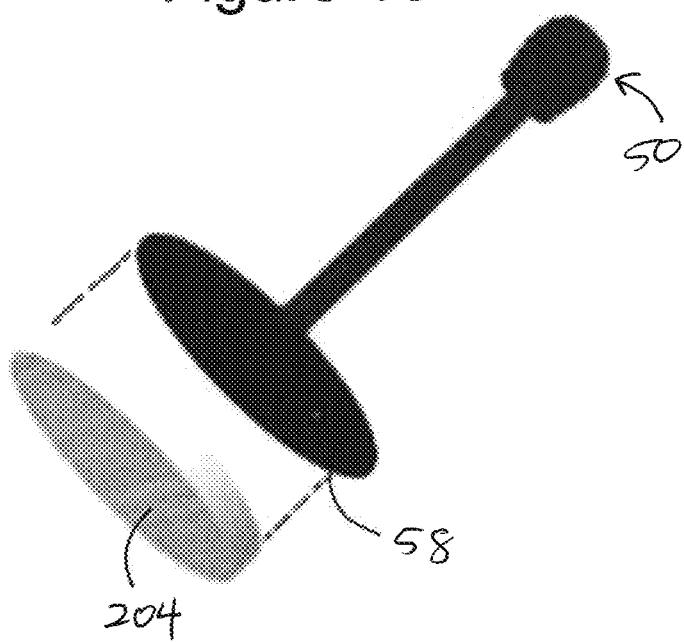
FIG. 16 is side perspective view of the holder of FIG. 13 partially assembled with a polishing pad.

When device 10 is submerged in fluid 206 in container 200, and an article, such as the polishing pad shown in FIGS. 15 and 16, is pushed against wash surface 18, a downward force is applied to wash surface 18 such that cover 12 is pressed towards base 14. At least a portion of the fluid situated below cover 12 is thus directed or forced through ducts 22 onto the article. Given the sloping or tapering geometry of internal walls 21, and aided by the curved edges 27, 29 of entrance opening 23 and exit opening 25, a Venturi effect may be generated when fluid 206 is forced through ducts 22. This increases the speed of the fluid as it leaves exit opening 25 and encounters the article, helping to rinse and wash the article. At the same time, extensions 30 slide through openings 44 until tabs 46 come into contact with top ends 34 of holes 32. This limits or stops the compression of cover 12 into base 14.

Using device 10 as shown in the Figures, the fluid situated below cover 12 may approximately be divided generally into three portions. A central portion of fluid is within first and second conduits 24, 42 when device 10 is in the expanded configuration. An intermediary portion of fluid is situated around the central portion of fluid and below intermediary ducts 33. Further, a periphery portion of fluid is situated around the intermediary portion of fluid below peripheral ducts 35.

When the article is pushed against wash surface 18, the central portion of fluid within first and second conduits 24, 42 is directed through central ducts 26 onto the article, the intermediary portion of fluid is directed through intermediary ducts 33, and the peripheral portion of fluid is directed through peripheral ducts 35 onto the article.

Due to the generally enclosed nature of the central portion of fluid within first and second conduits 24, 42, the central portion of fluid may be more forcefully directed through central ducts 26. As well, third conduit 31 extends from undersurface 20 to partially enclose the intermediary portion of fluid to direct the intermediary portion of fluid through the intermediary ducts 33. However, because third conduit 31 does not extend from undersurface 20 as far as first conduit 24 does, third conduit 31 does not enclose the intermediary portion of fluid to the same extent as first conduit 24 encloses the central portion of fluid.

Accordingly, the pressure of the central portion of fluid directed through central ducts 26 onto the article may be higher than the pressure of the intermediary portion of fluid directed through intermediary ducts 33. Such a feature may aid in cleaning the article as a higher pressure can provide greater scrubbing force on the article.

Further, since peripheral ducts 35 are not enclosed within any conduits, the peripheral portion of fluid directed through peripheral ducts 35 may have a lower pressure than that of the intermediary portion of fluid directed through intermediary ducts 33.

Any debris or particles that are scrubbed from the article will have a tendency to fall and eventually slide into channels 19. The convex shape of cover 12 allows gravity to direct the particles along channels 19 towards the edge of wash surface 18. The peripheral portion of fluid directed through peripheral ducts 35, at a lower pressure, may further help to wash the particles over the edge of cover 12.

Removing the downward force from cover 12 allows resilient member 16 to separate cover 12 from base 14 and permits cover 12 to return to its rest configuration. Given its submerged state, separation of cover 12 from base 14 allows fluid 206 to refill first and second conduits 24, 42 through a gap between first and second conduits 24, 42, and to re-enter the space between cover 12 and base 14.

When device 10 is in use as part of wash assembly 100, cover 12 is coupled with base 14 as described above to form device 10. Device 10 is submerged in a container 200 of fluid 206, and article 204, such as the depicted polishing pad, may be releasably secured to head 52. If head 52 has Velcro surface 58, article 204 may simply be aligned over, and pressed onto, Velcro surface 58. As understood by the skilled person, an article other than a polishing pad may be releasably secured to head 52 for washing with device 10, such as a wash cloth or sponge.

In applications where device 10 is to be seated directly on bottom 202 of container 200, device 10 may not have extensions 30 and first and second conduits 24, 42 may further function as the sliding mechanism. Alternately, if device 10 includes a sliding mechanism, rather than extensions 30 and openings 44, the sliding mechanism may instead include the tube and pin combination described above.

Holding handle 54 of holder 50, a user can align head 52 over washing surface 18 (see FIGS. 7 and 16) and press head 52 onto washing surface 18, which in turn presses cover 12 into base 14 as described above. Lifting head 52 from washing surface 18, allows resilient member 16 to separate cover 12 from base 14 and permits the cover to return to its rest configuration. This pumping motion may be repeated as desired by the user to clean article 204.

When device 10 is in use as part of washing system 150, device 10 may be seated on top of filter 60, where each extension 30 is inserted into a corresponding gap 66 in filter 60 to retain device 10 in place over filter 60.

It is expected that in most cases device 10 will be used together with a Dirt Lock™. In that situation, extensions 30 are received within gaps 66 in the Dirt Lock™. Lower ends 39 of extensions 30 are deflected toward one another to allow sloped tabs 37 on the outer surface of extension 30 to be received through slots or gaps 66 in the Dirt Lock™. The sloped edge on sloped tabs 37 forces lower legs 39 inwardly as cover 12 and base 14 are pushed against the Dirt Lock™. As sloped tabs 37 clear the top surface of the Dirt Lock™, legs 39 snap back into place and tabs 37 secure base 14 to the Dirt Lock™ (see FIG. 8 for example).

Both device 10 and filter 60 may then be placed in container 200 and submerged within fluid 206 as shown in FIG. 7. In the depicted scenario, filter 60 suspends device 10 above bottom 202 of container 200, but fully within fluid 206.

When head 52 of holder 50 with article 204 is pressed onto washing surface 18 as described above, particles and debris may be washed and scrubbed off from article 204 and then may collect in channels 19. Channels 19 then tend to direct the particles and debris towards the periphery and over the edge of cover 12. The particles and debris may then fall into flow director 62 of filter 60. Filter 60 (such as a Dirt Lock™) may then filter or separate the particles and debris at bottom 202 of container 200 of fluid 206, below filter 60. Filter 60 thus helps to prevent dirt particles from swirling back up through container 200 of fluid 206 and re-adhering to article 204.

In this embodiment, when device 10 is suspended above bottom 202 of container 200, each extension 30 can slide through and past its corresponding gap 66 in filter 60 when cover 12 is compressed or pumped, without contacting bottom 204 of container 200, where the unwanted debris and particles have collected.

While a Dirt Lock™ has been shown as filter 60, other filters may be used in combination with device 10 and holder 50.

Figure 17:
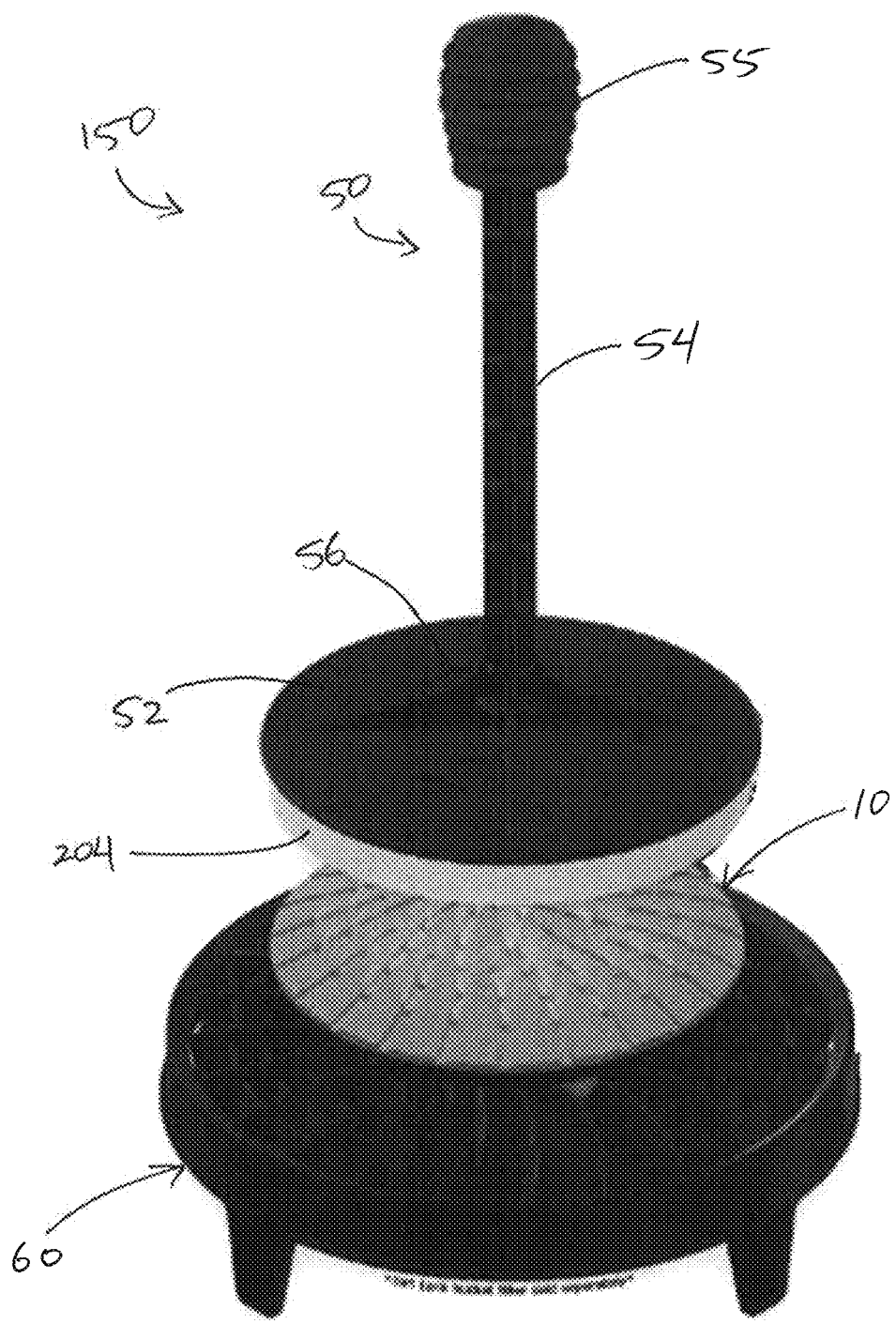
FIG. 17 is an upper perspective view of the assembled washing system with the components of FIGS. 15 and 16.
Figure 18:
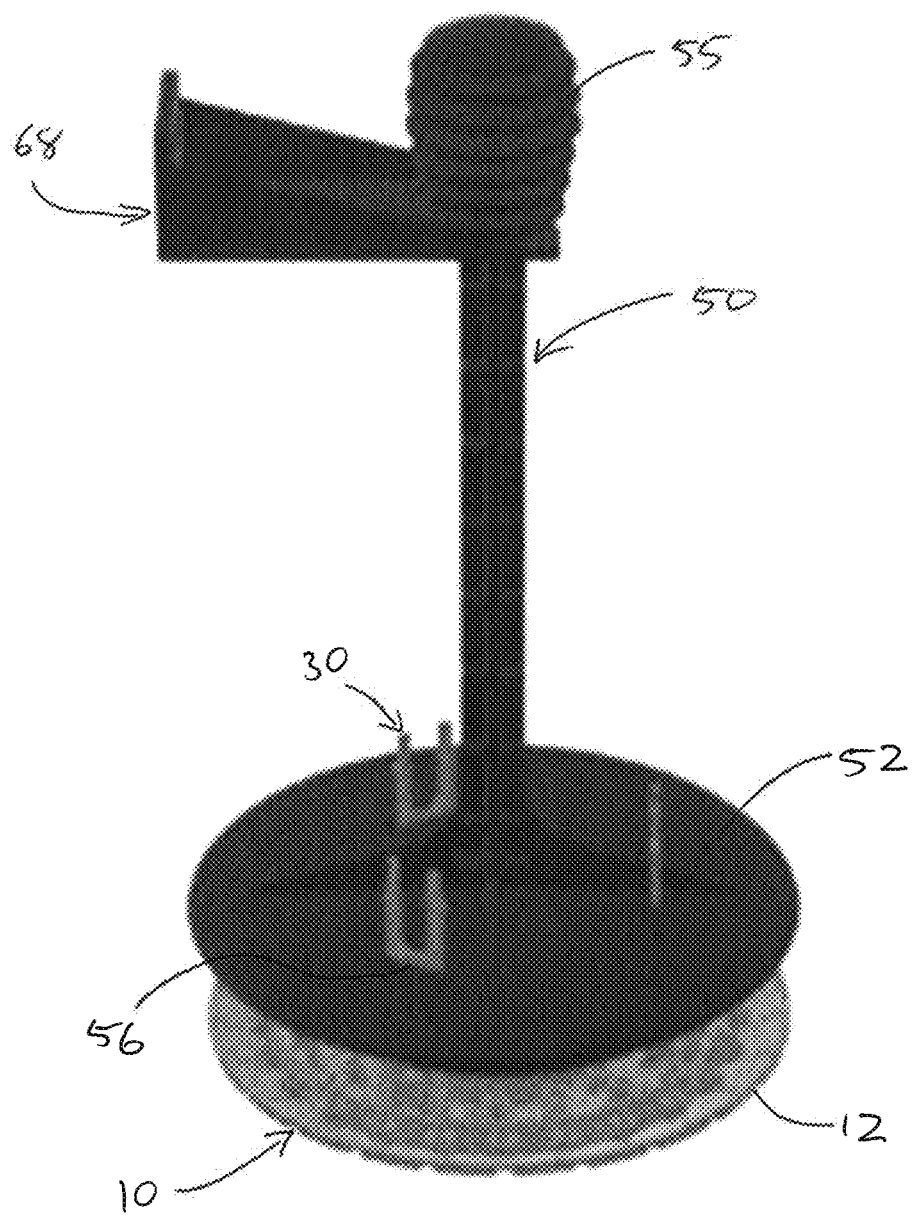
FIG. 18 is an upper perspective view of the components of FIGS. 11-14 assembled in storage.

After use, device 10 may be separated from filter 60 and the article may be separated from holder 50. Device 10 can be inverted and extensions 30 may then be inserted through slots 56 in head 52, retaining device 10 upon holder 50. As best seen in FIG. 17, handle 54 may then be hooked onto bracket 68, which may in turn be secured to a wall. In this manner, bracket 68 can be used to suspend holder 50, which may in turn suspend device 10 for drying and/or storage purposes.

It is to be understood that what has been described are the preferred embodiments of the invention, though workers skilled in the art will recognize that changes may be made in form and detail without departing from the spirit and scope of the invention. The scope of the claims should not be limited by the preferred embodiments set forth above, but should be given the broadest interpretation consistent with the description as a whole.

The invention claimed is:

1. A device for washing an article in a container of fluid, the device comprising:
   a cover having a wash surface, an opposed undersurface, and multiple ducts extending therethrough, each of the ducts has an internal wall that tapers outwardly as the duct extends downwardly from the wash surface;
   a base operatively coupled to the cover, the base having a support surface and an opposed interior surface positioned facing the undersurface of the cover;
   a resilient member positioned between the cover and the base to bias the cover and base apart;
   a first conduit extending from the undersurface of the cover and surrounding a first subset of the ducts;
   a second conduit extending from the interior surface of the base, the second conduit positioned and dimensioned to slidably telescope with the first conduit, wherein moving the cover toward the base directs fluid within the first and second conduits through the first subset of ducts onto the article; and
   a third conduit extending from the undersurface of the cover, the third conduit concentrically surrounding the first conduit and a second subset of the ducts, wherein moving the cover toward the base directs fluid located between the first and the third conduits through the second subset of ducts onto the article, and
   wherein pushing the article against the wash surface moves the cover towards the base and directs a portion of fluid positioned between the cover and the base through the first and second subsets of the ducts onto the article.

2. The device of claim 1, wherein each of the ducts has an entrance opening with a radiused entrance edge, and an exit opening with a radiused exit edge.

3. The device of claim 1, wherein each of the ducts extends past the undersurface of the cover.

4. The device of claim 1, wherein the first subset of ducts comprises central ducts positioned centrally in the cover and within the first conduit.

5. The device of claim 1, wherein the second subset of ducts comprises intermediary ducts positioned around the central ducts and between the first and the third conduits.

6. The device of claim 5, wherein the third conduit extends from the undersurface of the cover at least to an extent equal to the entrance openings of the ducts.

7. The device of claim 6, wherein the cover has a circumference and a third subset of the ducts, the third subset of ducts being periphery ducts positioned proximate the circumference of the cover radially exterior to the third conduit,
wherein pushing the article against the wash surface directs fluid beneath the cover and radially exterior to the third conduit through the third subset of ducts.

8. The device of claim 7, wherein the wash surface further comprises elongated channels extending radially away from a centre of the cover, wherein the exit openings of the ducts are positioned within the channels.

9. The device of claim 5, wherein the first conduit extends further from the undersurface of the cover than the third conduit, and wherein the pressure of fluid directed through the central ducts is higher than the pressure of fluid directed through the intermediary ducts.

10. The device of claim 9, further comprising a sliding mechanism configured to operatively couple the cover and the base, the sliding mechanism comprising:
an extension extending from the undersurface of the cover; and
an opening in the base positioned and dimensioned to slidably receive the extension therethrough.

11. The device of claim 10, wherein the sliding mechanism further comprises a stopper mechanism for limiting relative movement between the cover and the base, the stopper mechanism comprising:
a hole in the extension, the hole having a top end and a bottom end; and
a tab in the base, the tab extending into the opening, the tab dimensioned to be received within the hole of the extension,
wherein engagement of the tab with the top end of the hole limits compression of the of the device, and engagement of the tab with the bottom end of the hole limits separation of the cover from the base.

12. The device of claim 11, wherein the resilient member is a spring positioned within the first and second conduits.

13. A wash assembly for washing an article in a container of fluid, the assembly comprising:
the device of claim 10; and
a holder comprising:
a head configured to be releasably securable to the article; and
an elongated handle secured to the head.

14. The assembly of claim 13, wherein the head includes a slot dimensioned to releasably receive an extension of the device therethrough, for holding the device in storage.

15. A system for washing an article in a container of fluid, the system comprising:
the device of claim 10, and
a filter configured to be submerged in the fluid in the container for filtering debris particles from the fluid in the container and retaining the particles proximate a bottom of the container.

16. The system of claim 15, wherein the filter comprises a support for maintaining the filter in a spaced relation from a bottom of the container, and wherein the device is configured to be seated on top of the filter in the container of fluid.

17. The system of claim 16, wherein the filter comprises a gap positioned to correspond with the opening in the base, the gap dimensioned to slidably receive an extension therethrough for securing the base to the filter.

\* \* \* \* \*